United States Patent [19]

Tolerson

[11] 4,180,299
[45] Dec. 25, 1979

[54] CARRIER

[76] Inventor: Lawrence E. Tolerson, 3319 Barth, Flint, Mich. 48504

[21] Appl. No.: 896,972

[22] Filed: Apr. 17, 1978

[51] Int. Cl.$^2$ ............... A47B 81/06; B65D 85/672
[52] U.S. Cl. ............... 312/242; 312/208; 312/10; 224/311; 206/387
[58] Field of Search ............... 312/242, 9, 10, 13, 312/14, 284, 111, 308; 206/387; 224/42.1 C, 42.46 R

[56] References Cited

U.S. PATENT DOCUMENTS

| | | | |
|---|---|---|---|
| 1,137,074 | 4/1915 | Morris | 312/308 |
| 2,119,407 | 5/1938 | Weiskopf | 312/308 |
| 2,639,068 | 5/1953 | Luby et al. | 224/42.1 C |
| 3,627,398 | 12/1971 | Reese | 206/387 |
| 3,644,010 | 2/1972 | Murphy | 206/387 |
| 3,710,900 | 1/1973 | Fink | 312/10 |
| 3,756,383 | 9/1973 | Kryter | 206/387 |
| 3,847,316 | 11/1974 | McInnes | 224/42.46 R |
| 3,856,192 | 12/1974 | Nelson | 312/10 |
| 4,082,387 | 4/1978 | Davis | 312/242 |

*Primary Examiner*—Victor N. Sakran
*Attorney, Agent, or Firm*—Gifford, Chandler, Van Ophem, Sheridan & Sprinkle

[57] ABSTRACT

A carrier is provided for use in the passenger compartment of a vehicle. The carrier in one embodiment is adapted to carry tape cassettes and/or tape cartridges and comprises a housing open at its top and having a plurality of partitions laterally disposed across the housing and defining a plurality of slots or pockets wherein each slot is adapted to receive up to two tape cassettes or cartridges. The housing is detachably mounted in the passenger compartment of the vehicle so that it can be removed when the vehicle is unattended. The housing, when mounted, is pivotal between a first position in which the top of the housing is openly accessible from the interior of the passenger compartment and a second position in which the top of the housing is closed and is inaccessible to the interior of the passenger compartment. In another embodiment, the carrier is adapted to mount a Citizens band radio in a portion of the carrier.

20 Claims, 6 Drawing Figures

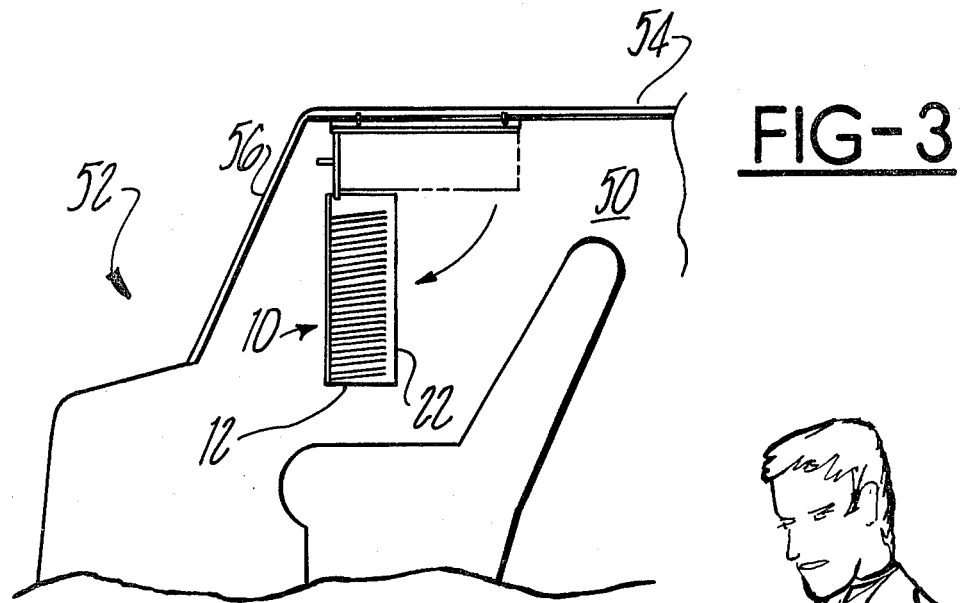
FIG-3
FIG-4
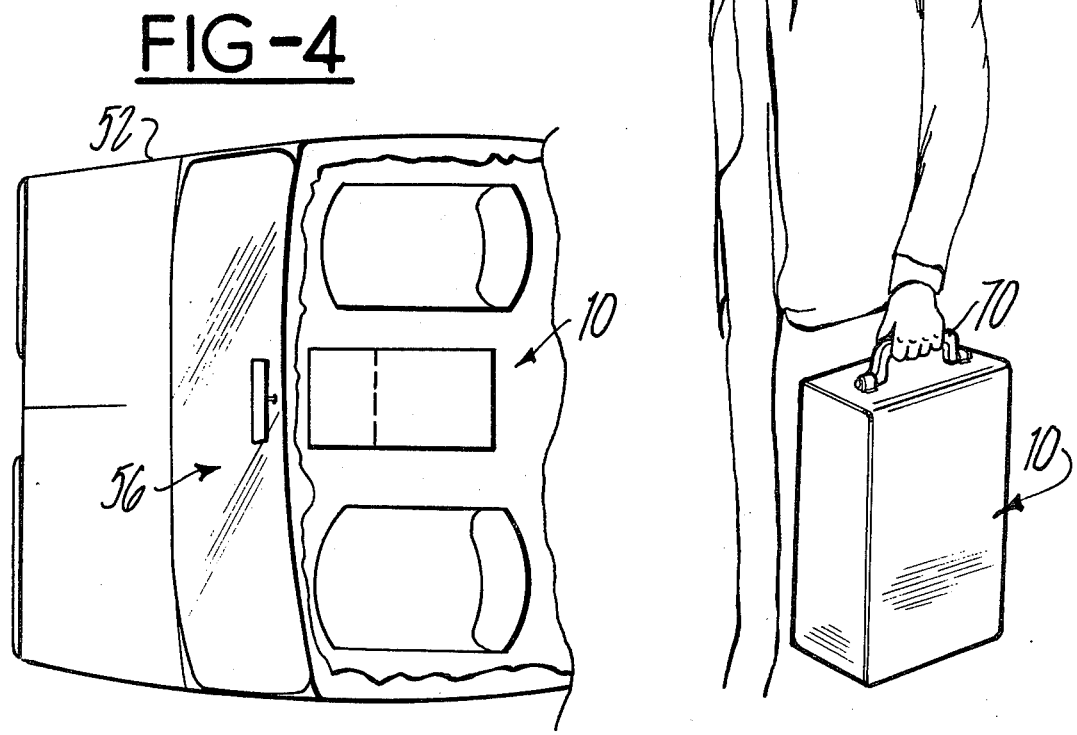
FIG-5

CARRIER

BACKGROUND OF THE INVENTION

I. Field of the Invention

The present invention relates generally to carriers for tape cassettes and/or cartridges and, more particularly, to such a carrier which is both detachably and pivotally mounted to the interior of a vehicle passenger compartment.

II. Description of the Prior Art

There are a plurality of previously known carriers for magnetic tape cartridges and tape cassettes, hereinafter some times collectively referred to as tape packages for brevity. These previously known carriers typically comprise a housing with receiving means in the housing for the receipt of a plurality of tape packages. A lid is oftentimes secured to the housing in order to selectively provide access into the interior of the housing and thus to the tape packages contained therein.

These previously known tape carriers, however, are disadvantageous in several different respects. First, such carriers are often placed behind the driver's seat, on the front floor, or at some other location which is difficult for the driver of the vehicle to reach during vehicle operation. Consequently, in order to obtain the desired tape package from the carrier, the drivers often fumble with the previously known carriers and, in doing so, look at the carrier, rather than the road, for relatively long periods of time. This, of course, results in a hazardous driving condition.

A still further disadvantage of these previously known tape carriers is that such carriers have been heretofore designed for only one type of tape package, i.e. tape cassettes or tape cartridges. The different types of tape packages, of course, vary in size from each other. These previously known carriers are incapable of either alternatively or simultaneously carrying different types of tape packages such that a different carrier is required for each different type of tape package. This solution, however, is unnecessarily expensive and cumbersome.

Further, to my knowledge, a detachable combination tape package carrier and Citizen's band radio carrier has not heretofore been provided.

SUMMARY OF THE PRESENT INVENTION

The present invention overcomes the above mentioned disadvantages of the previously known tape carriers by providing an improved tape carrier particularly adapted for use in a passenger vehicle.

In brief, the tape carrier according to the present invention comprises a housing open at its top. A plurality of partitions are laterally disposed across the housing and thus define a plurality of slots or packets, each slot being adapted for the receipt of at least one tape cartridge therein. Each partition, however, is divided into two half sections wherein one half section can be removed from the housing and positioned between two partitions. In doing so, the tape package receiving slots are narrowed such that the slots are dimensioned to receive a tape cassette, rather than a tape cartridge, therein.

The housing is both pivotally and detachably mounted to the ceiling of the vehicle passenger compartment and is movable between a first and second position. In the first position the housing extends vertically downwardly into the passenger compartment for easy access to the tape packages in the carrier. Conversely, in the second position the housing is pivoted to a generally horizontal position against the ceiling of the passenger compartment so as not to interfere with the driver's vision or operation of the vehicle.

In a preferred modification at least a portion of the carrier is adapted to receive a Citizens band radio.

As previously mentioned, the housing is detachably mounted to the ceiling of the passenger compartment. This permits the entire housing with its contents to be removed from the passenger compartment while unattended in order to prevent theft of the contents of the carrier.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which:

FIG. 3 is a partial diagrammatic side view illustrating the tape carrier according to the present invention installed in a vehicle;

FIG. 4 is a top plan view illustrating the tape carrier of the present invention installed in a vehicle;

FIG. 5 is perspective view illustrating the tape carrier according to the present invention and detached from the vehicle.

DETAILED DESCRIPTION OF THE PRESENT INVENTION

Figure 1:
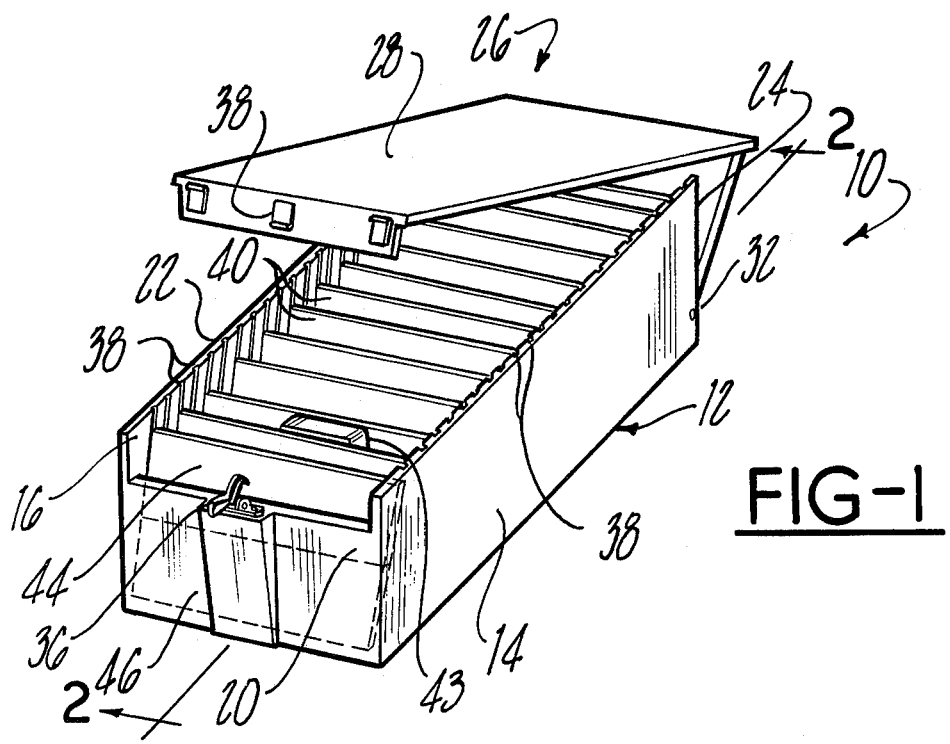
FIG. 1 is a perspective view illustrating the tape carrier according to the present invention.
Figure 2:
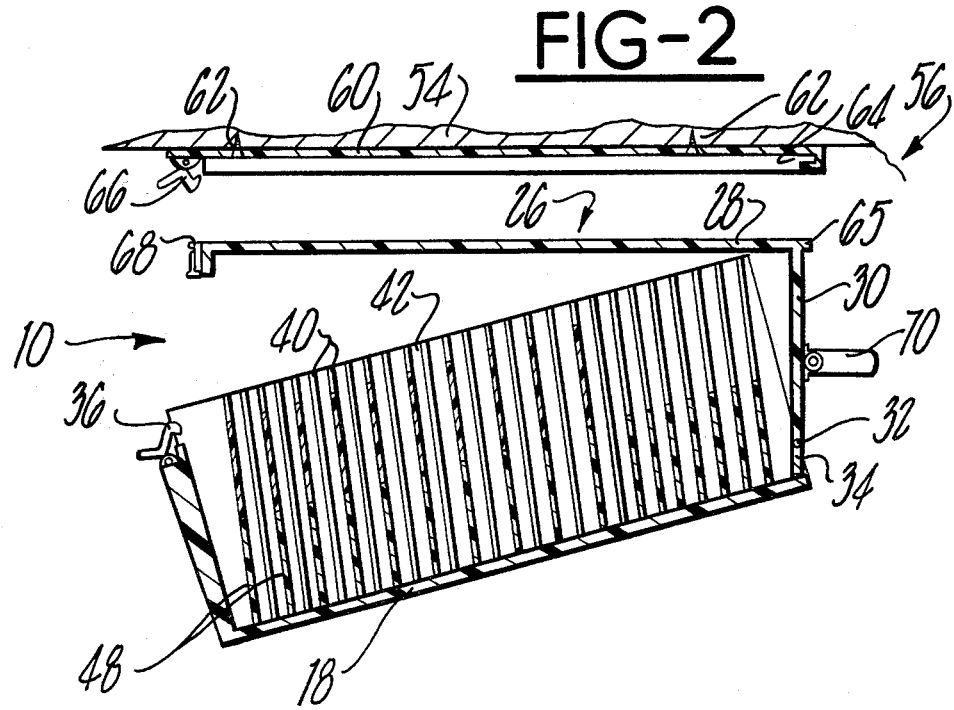
FIG. 2 is a sectional view illustrating the tape carrier according to the present invention.

With reference first to FIGS. 1 and 2, the tape carrier 10 according to the present invention is thereshown and comprises a housing 12 having sidewalls 14 and 16, a bottom 18 and a front wall 20. The housing 12 is open both on its top 22 and along its back 24.

A generally L-shaped lid 26 is provided and comprises a first leg 28 and a second leg 30. The free end 34 of the second leg 30 is pivotally connected by pins 32 to the sidewalls 14 and 16 of the housing 12 adjacent both the open back 24 and the bottom 18 of the housing 12. The lid 26 is movable via the pivotal pins 32 between an open and closed position. In the open position, the first leg 28 of the lid 26 is moved away from the open top 22 of the housing 12 and thus provides access into the interior of the housing 12. Conversely, in the closed position the first leg 28 of the lid 26 covers the open top 22 of the housing 12 while simultaneously the second leg 30 of the lid 26 forms a back wall for the housing 12. A suitable latch 36 on the front wall 20 of the housing 12 selectively engages a protruding portion 38 on the lid 26 in order to lock the lid 26 in its closed position.

Still referring to FIGS. 1 and 2, a plurality of spaced slots 38 are provided along the interior of both sidewalls 14 and 16 so that the slots on the opposite sidewalls face and are in alignment or register with each other. The slots 38 extend from the bottom 18 of the housing 12 to the open top 22 and preferably the tops of the slots 38 are angled slightly rearwardly, as best shown in FIG. 2, for a reason to be subsequently described.

A plurality of flat and rectangular partitions 40 are provided and each partition 40 is adapted to be slidably received within a pair of facing slots 38 on the opposing sidewalls 14 and 16. The partitions 40 thus extend transversely laterally across the interior of the housing 12 and divide the interior into a plurality of slots 42, each slot 42 being adapted to receive at least one tape package 43 therein. In addition, as best shown in FIG. 2, the partitions 40 are preferably disposed in every other slot 38 along the sidewalls 14 and 16 and, in doing so, the tape package receipt slot 42 is dimensioned to receive a tape cartridge therein.

Each partition 40 preferably further comprises an upper half section 44 and a lower half section 46, the sections 44 and 46 being substantially identical to each other. The upper half sections 44 of the partitions 40 can be removed from the slots 38 and inserted into the open slots 38 between the remaining lower half sections 46 of the partitions 40 thus producing a relatively narrow tape receipt slot 48 (FIG. 2) having a width sufficient to receive a tape cassette therein. It will, of course, be understood that the upper half sections 44 of the partitions 40 can be arranged to produce either the relatively wide tape receipt slots 42 for tape cartridges or the relatively narrow tape receipt slots 48 for tape cassettes or any combination thereof as desired by the user.

With references now to FIGS. 2-4, the carrier 10 according to the present invention is designed primarily for use within the interior of a passenger compartment 50 of a vehicle 52. More specifically, the carrier 10 according to the present invention is mounted to the ceiling 54 of the passenger compartment 50 substantially on the longitudinal center line of the vehicle 52 and towards the front 56 of the vehicle 52.

The means for mounting the carrier to the passenger compartment ceiling 54 are best shwon in FIG. 2 and comprises a mounting plate 60 secured to the ceiling 54 by appropriate fasteners 62. A U-shaped channel 64 is formed laterally across the forward end of the mounting plate 60 in which a protruding portion 65 of the first leg 28 of the lid 26 is positioned. A latch 66 on the rear end of the mounting plate 60 cooperates with a protruding portion 68 on the front of the lid leg 28. Therefore, to secure the carrier 10 to the vehicle ceiling 54, the lip 65 is first positioned in the U-shaped channel 64 of the mounting plate 60 whereafter the front end of the carrier 10 is swung upwardly until the latch 66 engages and locks the front of the lid 26 to mounting plate 60. The detachment of the carrier 10 from the mounting plate 60 can be easily achieved by merely operating the latch 66 and reversing the above described steps.

The operation of the carrier 10 can be best described with reference to FIG. 3 in which the carrier 10 is shown secured to the ceiling 54 of the passenger compartment 50. Due to the pivotal connection between the lid 26 and the housing 12, the housing 12 can be pivoted downwardly to the vertical position depicted in solid line in FIG. 3 by simply releasing the latch 36 between the housing 12 and the lid 26. In doing so, the open top 22 of the housing 12 is openly accessible to the interior 60 of the passenger compartment 50 for selection or replacement of the desired tape package. Moreover, with the housing 12 in its vertically downward or accessible position, the housing 12 is positioned forwardly and slightly rightwardly of the driver's seat so that distraction of the driver's attention from the road is minimized. Lastly, the partitions 40 are angled slightly upwardly when the housing 10 is in its downward or accessible position which prevents tape packages from falling out from the tape receipt slots 42 and/or 48.

After proper selection of the tape package, the housing 12 is pivoted upwardly to a generally horizontal position illustrated in phantom line in FIG. 3 so as not to interfere with the driver's operation of the vehicle 52. In doing so, the latch 36 between the housing 12 and lid 26 automatically engages to lock the housing in its horizontal position in which the interior of the housing 12 is inaccessible to the passenger compartment.

When the vehicle 52 is unattended, the carrier 10 can be simply and rapidly detached from the mounting plate 60 on the ceiling 54 by operation of the latches 66 as has been previously described. Such removal effectively prevents theft of the carrier 10 and its contents from the vehicle 52. A suitable handle 70 (FIG. 5) can be mounted on the housing 12 or lid 26 to facilitate transport of the carrier 10 when detached from the ceiling mounting plate 60.

Figure 6:
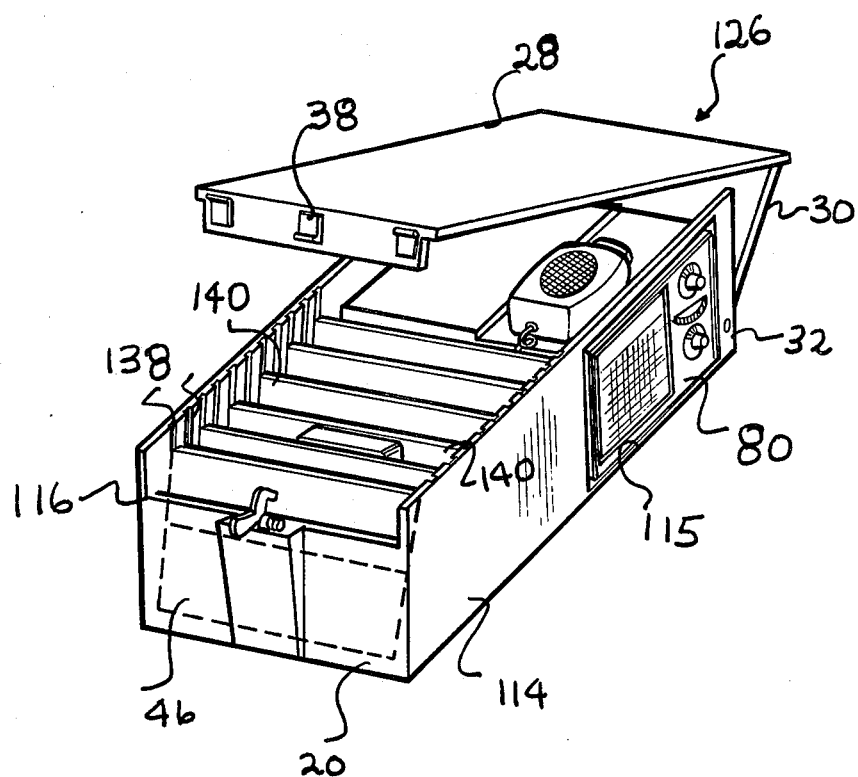
FIG. 6 is a view similar to FIG. 1 but illustrating a preferred modification of the present invention.

FIG. 6 illustrates a preferred modification of the carrier of the present invention in which a portion of the carrier is utilized to house a Citizens band radio 80. For this purpose the side wall 114 is provided with an opening 115 to provide access to the front of the Citizens band radio 80 when the carrier 126 is in the closed position.

A portion of the sidewalls 114 and 116 can still be provided with slots 138 to receive partition 140 so that the carrier 126 can also be used to carry tape packages 44.

Although the Citizens band radio 80 is shown in FIG. 6 as being mounted in the carrier 126 in a position to be accessible to the passenger and not to the driver of the vehicle, this has been done for illustrative purposes only and to more clearly indicate the manner of mounting the Citizens band radio 80 in the carrier 126. In most installations the front of the Citizens band radio 80 would be accessible through an opening (not shown) provided in the sidewall 116 to make the radio 80 accessible to the driver of the vehicle.

From the foregoing it can be seen that the present invention provides an improved carrier for tape cassettes, cartridges, or any combination thereof for use in a passenger vehicle 52. The carrier 10 not only minimizes distraction for the driver by facilitating the insertion or removal of the desired tape package from the carrier 10 but also is rapidly and easily detached from the passenger compartment 50 to prevent its theft while the vehicle 52 is unattended.

Having described my invention, however, many modifications thereto will become apparent to those skilled in the art to which it pertains without deviation from the spirit of the invention as defined by the scope of the appended claims.

I claim:

1. A carrier for removable mounting within a vehicle, said vehicle having a passenger compartment, said carrier comprising:

a housing, said housing being open on the top;

said housing defining a compartment accessible through the open top of said housing;

means for pivotally mounting said housing to the vehicle and within the passenger compartment, said housing being pivotal between a first position in which the top of the housing and said housing compartment is openly accessible to the interior of the vehicle compartment and a second position in which the top of the housing is closed so that said housing compartment is inaccessible to the interior of the vehicle compartment; and means for detachably securing said housing to the vehicle, wherein said pivotal means further comprises a lid pivotally connected to said housing about a pivotal axis fixed with respect to said housing and said lid, and extending laterally of said housing, and wherein said means for securing said housing to the vehicle comprises means for securing the lid to the vehicle passenger compartment, wherein when said lid is secured to the vehicle passenger compartment, said housing is pivotable between a position in which the top of said housing is openly accessible to the interior of the vehicle passenger compartment and a position in which the top of said housing is closed by said lid so that it is inaccessible to the interior of the vehicle passenger compartment.

2. The carrier as defined in claim 1 and including a plurality of partitions disposed laterally across said housing and defining a plurality of slots in said housing, each slot being adapted to receive at least one tape package.

3. The invention as defined in claim 1 and further comprising means for detachably securing said lid to the vehicle compartment.

4. The invention as defined in claim 1 wherein said vehicle compartment includes a ceiling and wherein said lid is secured to the ceiling of the vehicle compartment.

5. The invention as defined in claim 3 wherein said detachable securing means further comprises a mounting plate secured to the vehicle compartment and having a channel formed at one end, said lid having a protruding portion at one end receivable in said channel, and latch means for detachably securing the other end of the lid to the mounting plate.

6. The invention as defined in claim 1 and including means for mounting a radio in said compartment.

7. The invention as defined in claim 2 wherein said housing includes two sidewalls and a plurality of spaced slots formed along the interior of the sidewalls so that the spaced slots face each other and wherein said partitions are slidably received in the spaced slots.

8. The invention as defined in claim 7 wherein at least one partition comprises an upper and lower half sections, wherein with partition half sections in adjacent housing sidewall slots, the tape package receipt slot is dimensioned to receive a tape cassette therein and wherein with one partition positioned in every other housing sidewall slot, the tape package receiving slot is dimensioned to receive a tape cartridge therein.

9. The invention as defined in claim 8 wherein each partition comprises two half sections.

10. The invention as defined in claim 4 wherein the top of said housing depends vertically downwardly in its accessible position and wherein the top of said housing is substantially horizontal and facing the vehicle ceiling in its inaccessible position.

11. The invention as defined in claim 10 wherein with the carrier in its accessible position, the partitions are upwardly inclined with respect to a horizontal plane.

12. A carrier for removable mounting within a vehicle, said vehicle having a passenger compartment, said carrier comprising:

a housing, said housing being open on the top;

said housing defining a compartment accessible through the open top of said housing;

means for pivotally mounting said housing to the vehicle and within the passenger compartment, said housing being pivotal between a first position in which the top of the housing and said housing compartment is openly accessible to the interior of the vehicle compartment and a second position in which the top of the housing is closed so that said housing compartment is inaccessible to the interior of the vehicle compartment; and means for detachably securing said housing to the vehicle, wherein said pivotal means further comprises a lid pivotally connected to said housing and movable between a position covering the top of the housing and a position uncovering the top of the housing, and wherein said means for securing said housing to the vehicle comprises means for securing the lid to the vehicle passenger compartment, wherein said detachable securing means further comprises a mounting plate secured to the vehicle compartment and having a channel formed at one end, said lid having a protruding portion at one end receivable in said channel, and latch means for detachably securing the other end of the lid to the mounting plate.

13. The carrier as defined in claim 12 and including a plurality of partitions disposed laterally across said housing and defining a plurality of slots in said housing, each slot being adapted to receive at least one tape package.

14. The invention as defined in claim 12 wherein said vehicle compartment includes a ceiling and wherein said lid is secured to the ceiling of the vehicle compartment.

15. The invention as defined in claim 12 and including means for mounting a radio in said compartment.

16. The invention as defined in claim 12 wherein said housing includes two sidewalls and a plurality of spaced slots formed along the interior of the sidewalls so that the spaced slots face each other and wherein said partitions are slidably received in the spaced slots.

17. The invention as defined in claim 12 wherein at least one partition comprises an upper and lower half sections, wherein with partition half sections in adjacent housing sidewall slots, the tape package receipt slot is dimensioned to receive a tape cassette therein and wherein with one partition positioned in every other housing sidewall slot, the tape package receiving slot is dimensioned to receive a tape cartridge therein.

18. The invention as defined in claim 12 wherein each partition comprises two half sections.

19. The invention as defined in claim 12 wherein the top of said housing depends vertically downwardly in its accessible position and wherein the top of said housing is substantially horizontal and facing the vehicle ceiling in its inaccessible position.

20. The invention as defined in claim 12 wherein with the carrier in its accessible position, the partitions are upwardly inclined with respect to a horizontal plane.

* * * * *

UNITED STATES PATENT AND TRADEMARK OFFICE
CERTIFICATE OF CORRECTION

PATENT NO. : 4,180,299

DATED : December 25, 1979

INVENTOR(S) : Lawrence E. Tolerson

It is certified that error appears in the above-identified patent and that said Letters Patent are hereby corrected as shown below:

Column 2, line 42, after "bottom" insert --wall--.

Signed and Sealed this

Eighth Day of April 1980

[SEAL]

Attest:

SIDNEY A. DIAMOND

Attesting Officer

Commissioner of Patents and Trademarks